(12) United States Patent
Laughlin et al.

(10) Patent No.: US 9,052,485 B2
(45) Date of Patent: Jun. 9, 2015

(54) OPTICAL INTERCONNECT ASSEMBLY

(71) Applicant: Honeywell Federal Manufacturing & Technologies, LLC, Kansas City, MO (US)

(72) Inventors: Daric Laughlin, Overland Park, KS (US); Philip Abel, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 65 days.

(21) Appl. No.: 13/759,696

(22) Filed: Feb. 5, 2013

(65) Prior Publication Data

US 2014/0219603 A1    Aug. 7, 2014

(51) Int. Cl.
G02B 6/43      (2006.01)
G02B 6/12      (2006.01)

(52) U.S. Cl.
CPC .............. *G02B 6/43* (2013.01); *G02B 6/12004* (2013.01)

(58) Field of Classification Search
CPC .................................. G02B 6/43; G02B 6/12
USPC ....................................... 385/92, 14
See application file for complete search history.

(56) References Cited

U.S. PATENT DOCUMENTS

| | | | |
|---|---|---|---|
| 5,815,621 A | 9/1998 | Sakai et al. | |
| 6,339,503 B1 * | 1/2002 | Derstine et al. | 359/622 |
| 6,729,771 B2 * | 5/2004 | Kim et al. | 385/76 |
| 6,739,766 B2 * | 5/2004 | Xu et al. | 385/93 |
| 6,910,812 B2 * | 6/2005 | Pommer et al. | 385/92 |
| 6,957,920 B2 | 10/2005 | Luther et al. | |
| 6,963,119 B2 | 11/2005 | Colgan et al. | |
| 7,267,491 B2 | 9/2007 | Luther et al. | |
| 7,334,946 B2 * | 2/2008 | Lu | 385/88 |
| 7,350,985 B2 * | 4/2008 | Laughlin et al. | 385/89 |
| 7,411,206 B2 * | 8/2008 | Buisker et al. | 250/559.36 |
| 8,049,161 B2 * | 11/2011 | Sherrer et al. | 250/239 |
| 8,309,908 B2 * | 11/2012 | Sherrer et al. | 250/239 |
| 2002/0031313 A1 | 3/2002 | Williams | |
| 2002/0146216 A1 | 10/2002 | Schofield et al. | |
| 2003/0113071 A1 * | 6/2003 | Kim et al. | 385/76 |
| 2003/0113077 A1 * | 6/2003 | Xu et al. | 385/93 |
| 2003/0201462 A1 * | 10/2003 | Pommer et al. | 257/200 |
| 2004/0149940 A1 * | 8/2004 | Buisker et al. | 250/559.36 |
| 2005/0218317 A1 * | 10/2005 | Sherrer et al. | 250/239 |
| 2007/0029514 A1 * | 2/2007 | Buisker et al. | 250/559.36 |
| 2007/0140627 A1 * | 6/2007 | Lu | 385/89 |
| 2007/0235749 A1 * | 10/2007 | Laughlin et al. | 257/100 |
| 2011/0075965 A1 * | 3/2011 | DeMeritt et al. | 385/14 |
| 2012/0061693 A1 * | 3/2012 | Sherrer et al. | 257/88 |
| 2012/0263422 A1 | 10/2012 | Lu | |
| 2013/0259419 A1 * | 10/2013 | Charbonneau-Lefort | 385/14 |
| 2014/0169734 A1 * | 6/2014 | Kachru et al. | 385/33 |

* cited by examiner

Primary Examiner — Kaveh Kianni
(74) Attorney, Agent, or Firm — Hovey Williams LLP

(57) ABSTRACT

An optical assembly includes a substrate with a first row of apertures and a second row of apertures. A first optical die includes a first plurality of optical transducer elements and is mounted on the substrate such that an optical signal interface of each transducer element is aligned with an aperture of the first row of optical apertures. A second optical die includes a second plurality of optical transducer elements and is mounted on the substrate such that an optical signal interface of each of the second plurality of optical transducer elements is aligned with an aperture of the second row of optical apertures. A connector configured to mate with the optical assembly supports a plurality of optical fibers. A terminal end of each optical fiber protrudes from the connector and extends into one of the apertures when the connector is coupled with the optical assembly.

10 Claims, 6 Drawing Sheets

OPTICAL INTERCONNECT ASSEMBLY

GOVERNMENT INTERESTS

The present invention was developed with support from the U.S. government under a contract with the United States Department of Energy, Contract No. DE-ACO4-01AL66850. Accordingly, the U.S. government has certain rights in the present invention.

FIELD

Embodiments of the present invention relate to optical-to-electrical and electrical-to-optical transducers and connectors. More particularly, embodiments of the invention involve an assembly for quickly and reliably coupling a mechanically transferable (MT) connector to an electrical circuit.

BACKGROUND

Fiber optics are increasingly used in communications and networking applications due to the wide bandwidth each optical fiber is capable of carrying and because optical fibers are flexible and can be bundled as cables. When used in fiber-optic communication, for example, optical fibers generally permit digital data transmission over longer distances and at higher data rates than other forms of wired and wireless communications. An optical fiber is a cylindrical dielectric waveguide that transmits light along its axis, by the process of total internal reflection. The fiber consists of a core surrounded by a cladding layer. To confine the optical signal in the core, the refractive index of the core must be greater than that of the cladding.

Use of fiber optics presents challenges, such as the need for precise alignment in optical interconnects. Such interconnects require certain parts to be carefully and precisely placed to ensure optical signals are not interrupted. Interconnects for arrays of optical fibers, for example, are costly and time-consuming to manufacture, requiring each optical element to be precisely aligned.

The above section provides background information related to the present disclosure which is not necessarily prior art.

SUMMARY

An optical assembly constructed in accordance with an embodiment of the present invention comprises a rigid mount and a substrate secured to the mount. The substrate includes a first row of optical apertures, a second row of optical apertures, and a pair of optical dies. A first optical die includes a first plurality of optical transducer elements and is mounted on the substrate such that an optical signal interface of each transducer element is aligned with an optical aperture of the first row of optical apertures. A second optical die includes a second plurality of optical transducer elements and is mounted on the substrate such that an optical signal interface of each of the second plurality of optical transducer elements is aligned with an optical aperture of the second row of optical apertures.

An optical interconnect assembly constructed in accordance with another embodiment of the invention comprises an optical assembly and a connector configured to mate with the optical assembly. The optical assembly includes a substrate with a plurality of optical apertures and an optical die mounted on a first side of the substrate. The optical die includes a plurality of optical transducer elements each with an optical interface aligned with one of the optical apertures. The optical connector includes a rigid body and a plurality of optical fibers supported by the body. Each of the optical fibers extends beyond an outer surface of the connector body and terminates a distance from the outer surface. The optical connector is configured such that each of the fibers extends at least part way through one of the optical apertures from a second side of the substrate when the optical connector is coupled with the optical assembly.

In a related embodiment, the optical interconnect assembly includes a first row of optical apertures, a second row of optical apertures, and a pair of optical dies mounted thereon. A first optical die includes a first plurality of optical transducer elements and is mounted on a first side of the substrate such that an optical signal interface of each transducer element is aligned with an optical aperture of the first row of optical apertures. A second optical die includes a second plurality of optical transducer elements and is mounted on the first side of the substrate such that an optical signal interface of each of the second plurality of optical transducer elements is aligned with an optical aperture of the second row of optical apertures.

The optical connector includes a body and a plurality of optical fibers supported by the body, the optical fibers being arranged in two rows and configured such that each of the optical fibers extends beyond an outer surface of the body and terminates a distance from the outer surface. The optical connector is configured to mate with the optical assembly such that each of the fibers extends at least part way through one of the optical apertures from a second side of the substrate.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
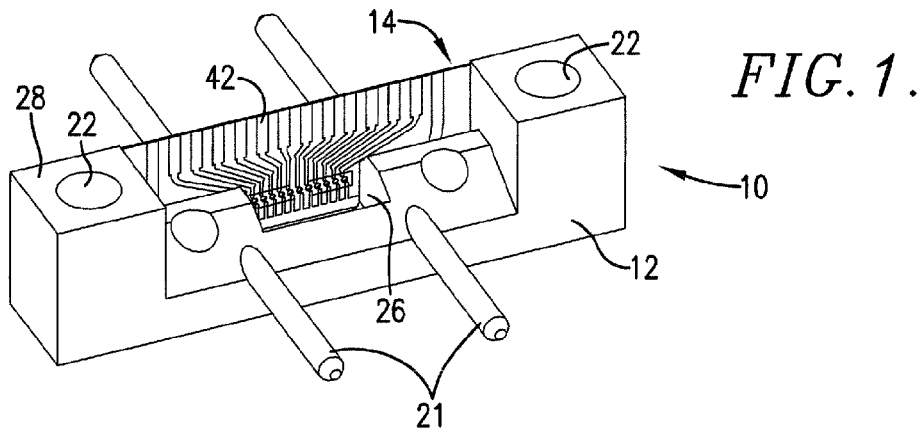
FIG. 1 is a perspective view of an optical assembly constructed in accordance with a first embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
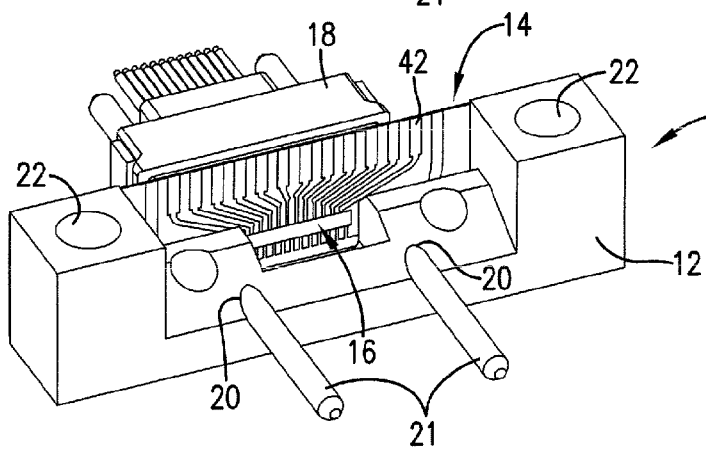
FIG. 2 is a perspective view of the optical assembly of FIG. 1, illustrating a mechanically transferable connector attached to the assembly.
Figure 3:
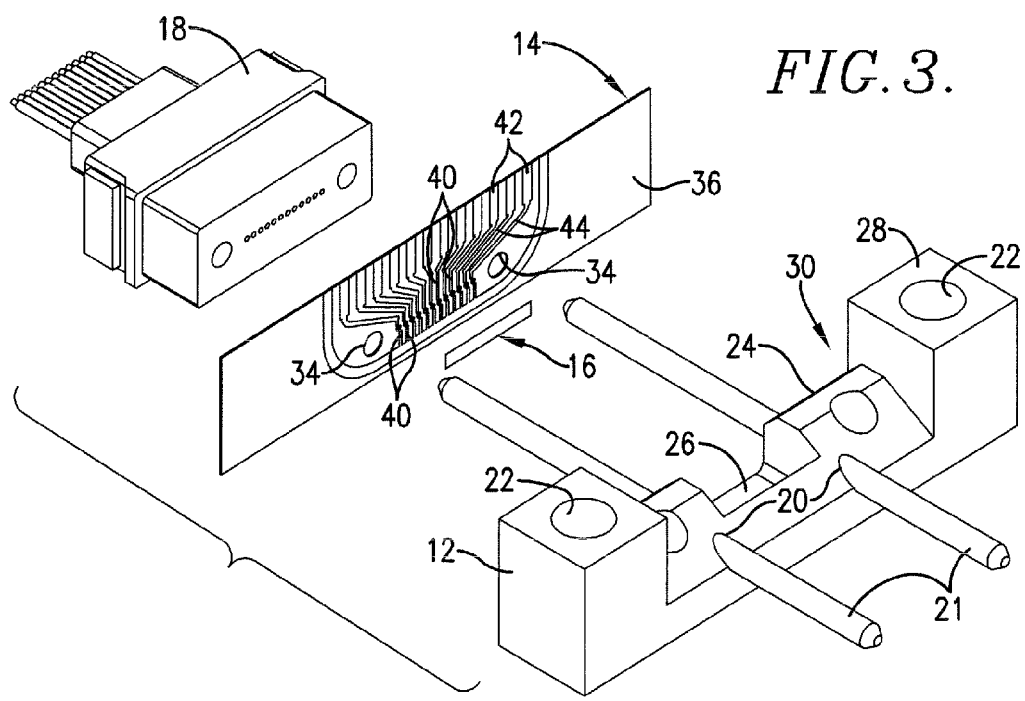
FIG. 3 is an exploded view of the optical assembly of FIG. 2.
Figure 4:
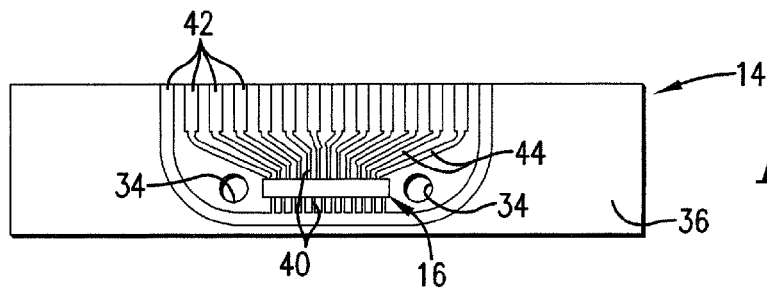
FIG. 4 is a rear elevation view of a substrate of the optical assembly of FIG. 1.
Figure 5:
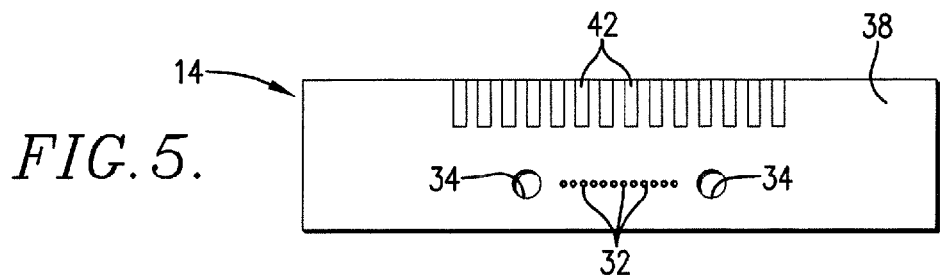
FIG. 5 is a front elevation view of the substrate of FIG. 4.

An optical assembly incorporating principles of the present teachings is illustrated in FIGS. 1-3 and designated generally by the reference numeral 10. The optical assembly 10 generally comprises a mount 12, a substrate 14, and an optical die 16. The assembly 10 generally interconnects an optical mechanically transferable (MT) connector 18 to an electrical circuit, such as a printed circuit board (PCB).

The mount 12 protects and gives rigidity to the substrate 14, protects the die 16, and provides a means for mounting the optical assembly 10 to an external structure, such as an external printed circuit board. Therefore, the mount 12 is preferably substantially rigid and may be constructed of plastic, ceramic, metal, or similar materials.

A plurality of alignment pin holes 20 generally extend from a front of the mount 12 to a back of the mount 12 along a first axis and receive alignment pins 21. As explained below, the alignment pin holes 20 provide a means for aligning the mount 12, the substrate 14, and the MT connector 18. A plurality of mounting holes 22 generally extend from a top of the mount 12 to a bottom of the mount 12 along a second axis. The mounting holes 22 may receive pins, screws, bolts, or other fastening devices to secure the mount 12 to an external structure.

A first side 24 of the mount 12 includes a recess 26 for receiving the optical die 16 when the substrate 14 is bonded to the mount 12. A bottom 28 of the mount 12 includes a bottom recessed portion 30 that exposes a plurality of external bonding pads of the substrate 14, as explained below in greater detail. While the alignment pin holes 20 and the mounting holes 22 are illustrated and described herein as generally being perpendicular to each other, it will be appreciated that alternative, equally preferred implementations may be used according to the demands of a particular situation, all of which are within the ambit of the present technology. For example, in some situations it may be desirable or necessary to position the mounting holes 22 so that they generally extend from a front of the mount 12 to a back of the mount 12 and thus are generally parallel to the alignment pin holes 20.

The substrate 14 supports the optical die 16 and provides one or more circuit elements for electrically interconnecting the optical die 16 with an external circuit, such as an external printed circuit board. The substrate 14 may be a printed circuit board and is sufficiently thin to minimize the divergence of light passing through the substrate and thereby minimizes optical losses during operation. Thus, the thickness of the substrate 14 is related to the optical divergence of the die 16 and the core size of the target optical fiber, such that the preferred thickness of the substrate 14 may vary according to the characteristics of the die 16 and the optical fiber used in MT connector 18.

The substrate 14 may be made from polyimide or a similar polymer or other material capable of enduring the high temperatures associated with solder re-flow processes. The substrate 14 may be a printed circuit board, a thin film network, a thick film network, a low temperature co-fired ceramic material, and so forth. In an exemplary implementation, the substrate 14 thickness is preferably within the range of from about 0.025 mm to about 1.27 mm, more preferably within the range of from about 0.050 mm to about 1.0 mm, and even more preferably within the range of from about 0.075 mm to about 0.75 mm. A thickness of 0.152 mm or less may be desirable, for example, when using a generic optical die and a 0.050 mm core optical fiber. It will be appreciated that other substrate thicknesses may be preferred or required for different types of optical die and/or optical fiber with different core sizes.

The substrate 14 includes an array of optical apertures 32 that allow light to pass through the substrate 14 incident on or generated from the optical die 16. The substrate 14 further comprises a plurality of alignment pin holes 34 that generally correspond to the alignment pin holes 20 of the mount 12 and are generally in registry with the alignment pin holes 20 of the mount 12 when the substrate 14 is bonded to the mount 12. The substrate 14 includes a first side 36 and a second side 38. A plurality of die bonding elements 40, such as solder pads, are located on the first side 36 of the substrate 14 and are used to secure the optical die 16 to the substrate 14. The die bonding elements 40 are positioned relative to the optical apertures 32 so that when the optical die 16 is bonded to the substrate 14 the optical apertures 32 of the substrate 14 are in registry with optical apertures of the die array 16.

In an exemplary implementation, the optical apertures 32 each have a diameter preferably within the range of from about 0.025 mm to about 0.49 mm, more preferably within the range of from about 0.050 mm to about 0.38 mm, even more preferably within the range of from about 0.075 mm to about 0.25 mm, most preferably about 0.152 mm. The center-to-center distance between two consecutive optical apertures 32 depends upon the requirements of the particular implementation but may be, for example, 0.25 mm.

A plurality of external bonding elements 42, such as solder pads, may be located on the first side 36 of the substrate 14, the second side 38, or both. The external bonding elements 42 provide a means for electrically and/or mechanically connecting the substrate 14 to an external structure, such as an external printed circuit board. A plurality of electrical traces 44 interconnect at least some of the die bonding elements 40 to at least some of the external bonding elements 42. When assembled, the first side 36 of the substrate 14 is bonded to the first side 24 of the mount 12 such that the optical die 16 corresponds to the recess 26 of the mount 12.

Figure 6:
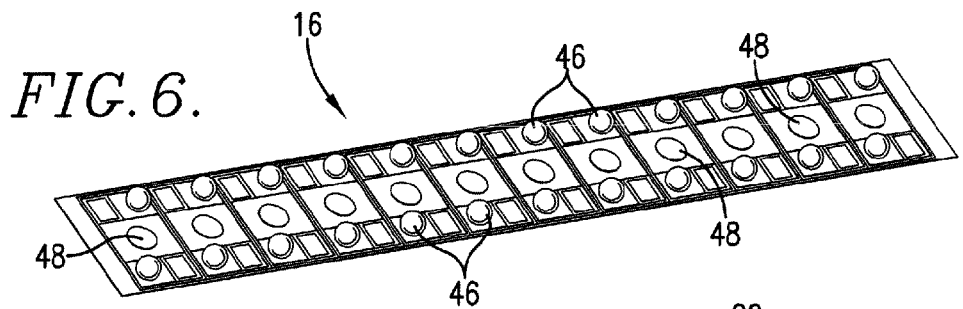
FIG. 6 is a perspective view of an optical die of the optical assembly of FIG. 1.

A perspective view of the optical die 16 is presented in FIG. 6. The optical die 16 includes one or more optical-to-electrical transducer elements, one or more electrical-to-optical transducer elements, or a combination thereof. Exemplary transducer elements may include, for example, a photodiode or a laser diode. A die including a plurality of optical elements presents particular advantages over existing methods of assembling optical array connectors because, for example, a die with an array of elements is aligned and secured as a single entity as opposed to each individual element.

The optical die 16 includes a plurality of solder beads 46 for electrically and mechanically attaching the optical die 16 to the substrate 14. The solder beads 46 may be made of any solder material known in the art, including, for example, Au/Sn, In/Sb, and so forth. The solder beads 46 generally correspond with the die bonding elements 40 of the substrate 14 when the optical die array 16 is placed on the substrate 14.

An optical signal interface 48 associated with each optical element may include an aperture for allowing light to pass into or out of each element of the optical die array 16, and the interfaces 48 are located to be in registry with the optical apertures 32 of the substrate 14 when the optical die array 16 is soldered to the substrate 14, as explained below in greater detail. While the present teachings are generally discussed with reference to an optical die including a plurality of optical elements, it will be appreciated that the present teachings contemplate use of virtually any number of optical elements a single die element.

The die 16 may be virtually any size according to the requirements of the particular implementation. In an exemplary implementation, the optical die 16 preferably has a length within the range of from about 2.5 mm to about 3.6 mm, more preferably from about 2.7 mm to about 3.4 mm, even more preferably from about 2.9 mm to about 3.2 mm, most preferably about 3.15 mm. In the exemplary implementation, the optical die 16 preferably has a width within the range of from about 0.35 mm to about 0.550 mm, more preferably from about 0.40 mm to about 0.5 mm, most preferably about 0.45 mm. The solder beads 46 may vary in size from one implementation to another according to the requirements of each implementation, but may be about 0.60 mm high and about 0.80 mm in diameter.

Figure 7:
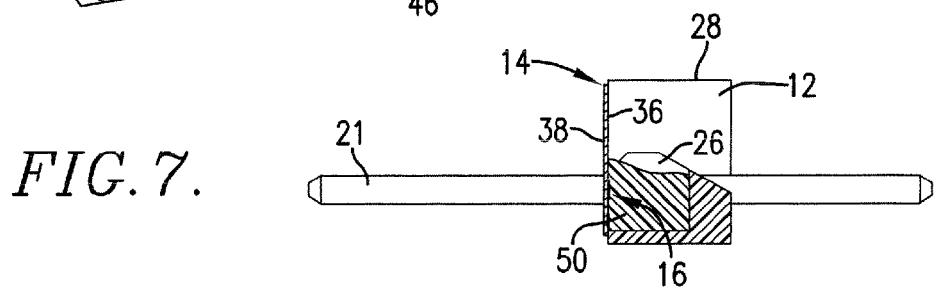
FIG. 7 is a side elevation cross sectional view of the optical assembly of FIG. 1.
Figure 8:
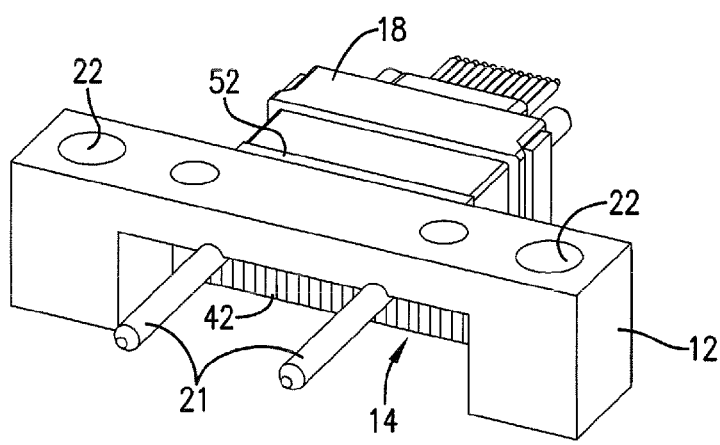
FIG. 8 is a perspective view of a first side of an optical assembly constructed in accordance with a second implementation of the invention and including an optical lens array.
Figure 9:
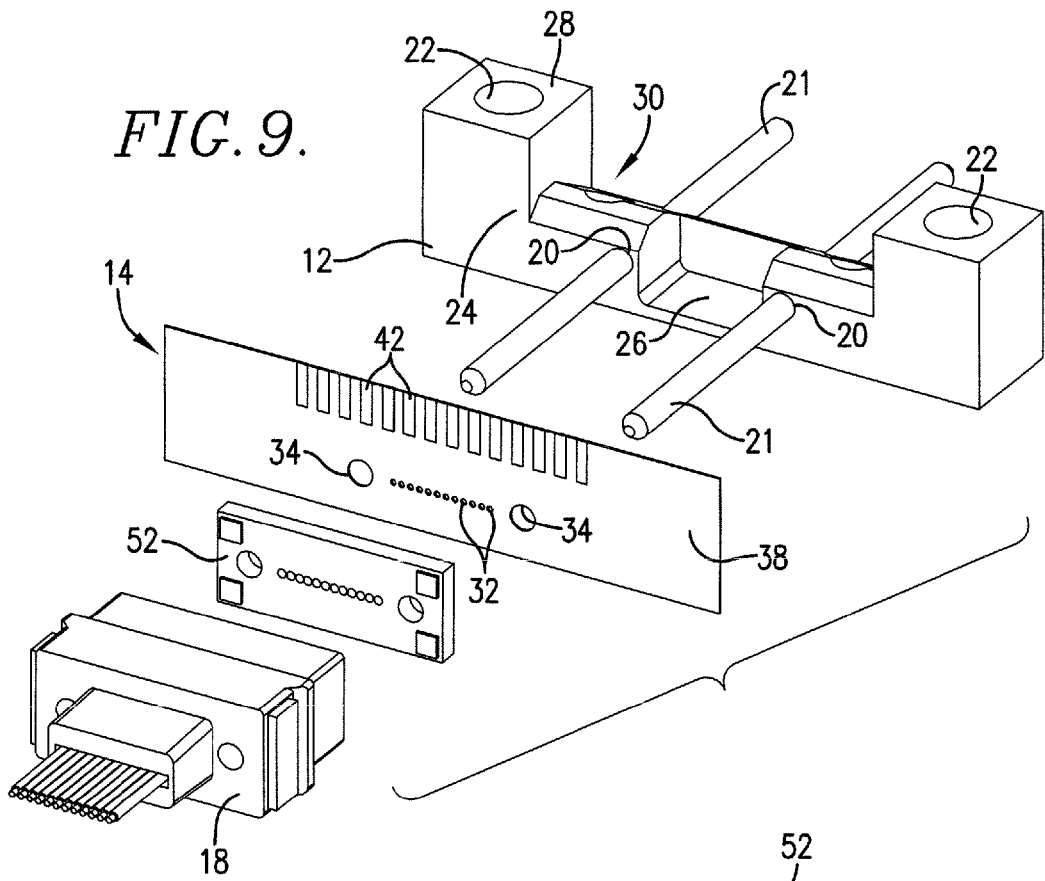
FIG. 9 is an exploded view of the optical assembly of FIG. 8.
Figure 11:
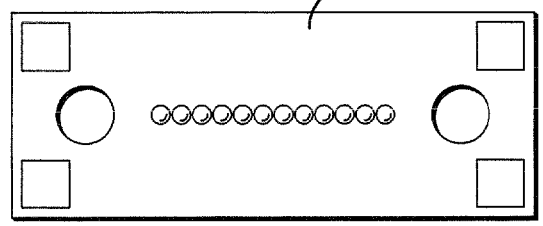
FIG. 11 is a front elevation view of the lens array of the optical assembly of FIG. 8.
Figure 10:
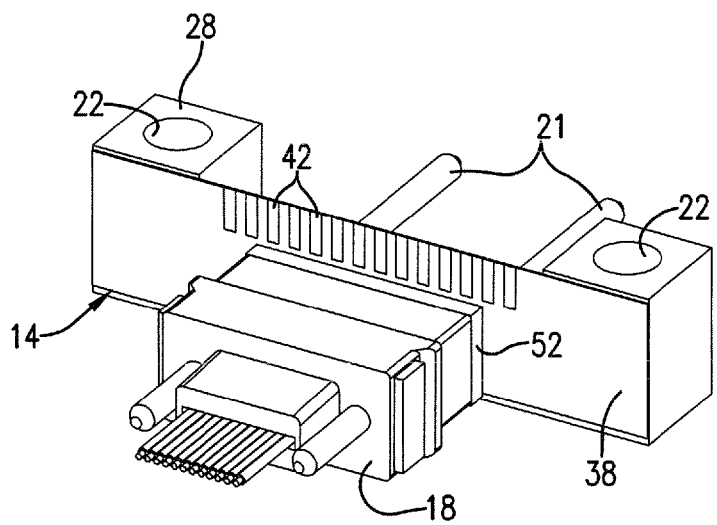
FIG. 10 is a perspective view of a second side of the optical assembly of FIG. 8.

A side elevation cross sectional view of the assembly 10 is presented in FIG. 7, further illustrating a sealant 50 placed in the recess 26 to partially or entirely encase the die 16, thereby protect the die 16. A thermally-conductive epoxy may be used for the sealant, thus providing heat dissipation from the die 16 to the mount 12.

Referring now to FIGS. 8-11, an alternative implementation of the present teachings includes a lens array 52 located between the substrate 14 and the MT connector 18. The lens array 52 includes a plurality of alignment pin holes that are generally in registry with the alignment pin holes 20 of the mount 12 and the alignment pin holes 34 of the substrate 14 when assembled. The lens array 52 is not necessary for operation of the optical assembly 10, but in certain implementations may improve the efficiency of the assembly 10 by, for example, focusing light emitted from the die 16 into each fiber (or vice versa) so that the light is within the numerical aperture of the fiber. The lens array 52 may also be used to focus light passing into the optical signal interface of the die 16. It will be appreciated that use of the lens array 52 increases the margin of error in the manufacture and assembly of the various components of the assembly 10. If an optical signal originating from the die 16 is focused by the lens array 52, for example, the assembly 10 is more tolerant of misalignment errors between the die 16 and the MT connector 18.

The shape and size of the lens array 52 may vary from one implementation to another according to the requirements of each implementation. In an exemplary implementation, however, the length of the lens array 52 is about 6.4 mm and the width is about 2.5 mm. The thickness is preferably within the range of from about 0.05 mm to about 0.11 mm, more preferably from about 0.06 mm to about 0.10 mm, even more preferably from about 0.07 mm to about 0.09 mm, and most preferably about 0.08 mm. The center-to-center distance between consecutive lenses may be 0.25 mm, and the diameter of each lens may be 0.24 mm.

The optical assembly 10 is assembled by first bonding the optical die 16 to the die bonding pads 40 of the substrate 14. This involves aligning the optical die 16 with the bonding pads 40 such that the solder beads 46 of the die 16 correspond to the die bonding pads 40. The optical die 16 and substrate 14 are then heated sufficiently to cause the solder beads 46 to reflow and then allowed to cool, thereby bonding the optical die 16 to the die bonding elements 40 of the substrate 14. This process is often referred to as "flip-chip" bonding and is advantageous over other methods because, for example, the entire die 16 is bonded to the substrate 14 in a single process.

A sealant 50, such as an epoxy coating, is then applied to the optical die 16 to at least partially encase and protect the optical die 16. If a thermally-conducting epoxy is used as the sealant 50, it would further dissipate heat away from the die 16. The first side 36 of the substrate 14 (to which optical die 16 is bonded), is then bonded to the first side 24 of the mount 12 so that the optical die 16 is generally within the recess 26 of the mount 12. Thus, the optical die 16 will be at least partially enclosed by the mount 12 for protection. The substrate 14 may be bonded to the mount 12 using, for example, an epoxy. As illustrated in FIGS. 1, 2, 8, and 10, the external bonding elements 42 are exposed when the substrate 14 is bonded to the mount 12, thus facilitating attachment of the external bonding elements 42 to an external structure.

The mount 12 may then be permanently or removably attached to an external structure, such as an external printed circuit board, using, for example, the mounting holes 22 of the mount 12. Alternatively, the external bonding pads 42 of the substrate 14 may be bonded to a portion of the external structure. The MT optical connector 18 may be permanently or removably attached to the second side 38 of the substrate 14, wherein alignment pins extend through the alignment pin holes 20 of the mount 12 and the alignment pin holes 34 of the substrate 14, to ensure that the optical fibers of the MT connector are in registry with the optical apertures 32 of the substrate 14 and the optical apertures 48 of the optical die 16.

Figure 12:
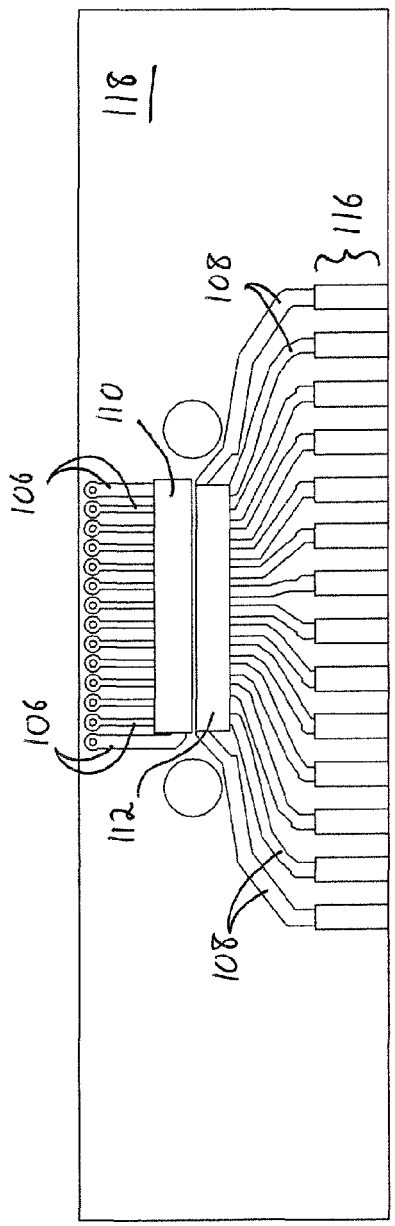
FIG. 12 is a rear elevation view of a substrate for use with the optical assembly of FIG. 1 and constructed in accordance with another embodiment of the invention.
Figure 13:
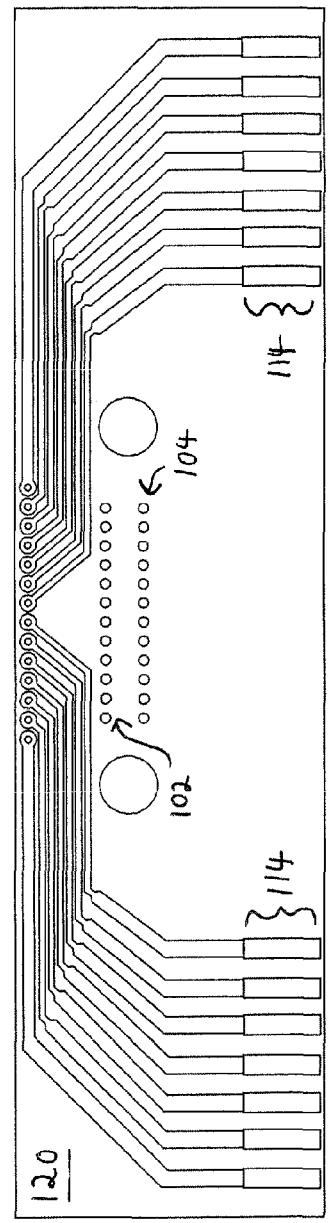
FIG. 13 is a front elevation view of the substrate of FIG. 12.

A substrate 100 constructed in accordance with another embodiment of the invention is illustrated in FIGS. 12 and 13. The substrate 100 is similar in form and function to the substrate 14 described above, except that the substrate 100 is configured for use with two optical dies rather than one. More particularly, the substrate 100 includes two rows of optical apertures 102, 104 and associated die bonding elements 106, 108 to accommodate two optical dies 110, 112. The substrate 100 also includes two sets 114, 116 of external connection elements electrically associated with the die bonding elements 106, 108.

A first plurality of die bonding elements 106 is located on a first side 118 of the substrate 100 and is associated with the first row 102 of optical apertures to secure the first optical die 110 to the substrate 100 such that an optical signal interface of each of the optical elements of the die 110 is aligned with one of the optical apertures 102. A second plurality of die bonding elements 108 is also located on the first side 118 of the substrate 100 and is associated with the second row 104 of optical apertures to secure the second optical die 112 to the substrate 100 such that an optical signal interface of each of the optical elements is aligned with one of the optical apertures 104.

A first plurality of external connection elements 114 is associated with the first plurality of bonding pads 106 and a second plurality of external connection elements 116 is associated with the second plurality of bonding pads 108. As illustrated, the first plurality of external connection elements 114 is located on a second side 120 of the substrate 100 while the second plurality of external connection elements 116 is located on the first side 118 of the substrate 100. Each of the external connection elements 114, 116 is in electrical communication with at least one of the die bonding pads 106, 108 to communicate signals between the optical dies 110, 120 and an external circuit. The external connection elements 114, 116 may be similar to the external bonding elements 42 described above.

The first optical die 110 is attached to the first plurality of die bonding elements 106 such that the optical signal interfaces of the optical die elements are aligned with the first row 102 of optical apertures of the substrate 100. The second optical die 112 is attached to the second plurality of die bonding elements 108 such that the optical signal interfaces of the optical die elements are aligned with the second row 104 of optical apertures. Each of the optical dies 110, 112 may be similar to the optical die 16 described above in form and function and may include one or more optical-to-electrical transducer elements, one or more electrical-to-optical transducer elements, or a combination thereof. It may be desirable, for example, to use a first optical die with optical-to-electrical sensor elements, such as vertical-cavity surface-emitting lasers, and a second optical die with electrical-to-optical sensor elements, such as photodiodes, to enable simultaneous signal transmission and reception with the assembly 10.

Figure 14:
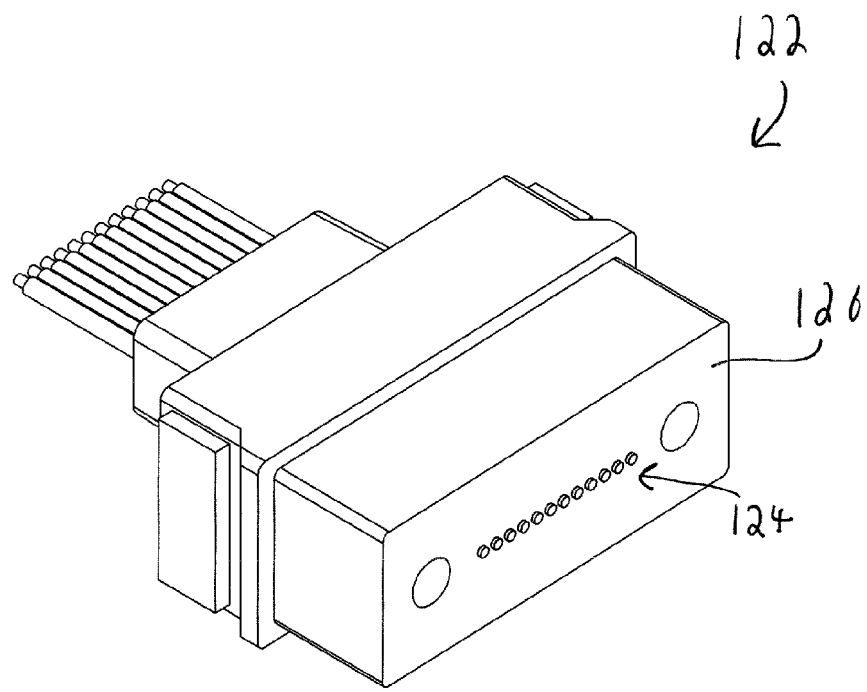
FIG. 14 is a front perspective view of a mechanically transferable optical connector constructed in accordance with another embodiment of the invention.
Figure 16:
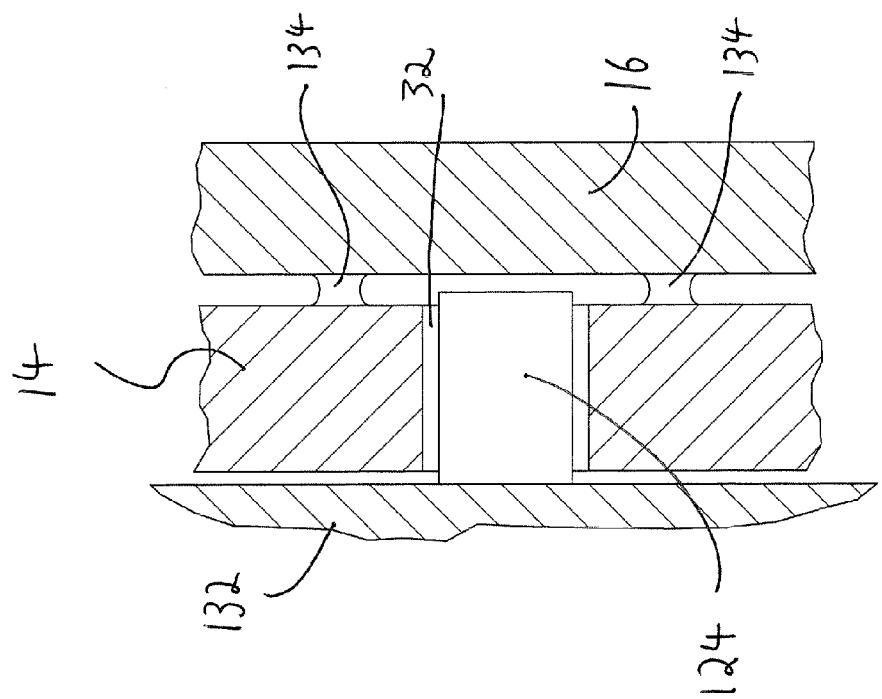
FIG. 16 is a fragmentary cross-sectional view of a portion of an optical interconnect assembly including either of the connectors illustrated in FIG. 14 or 15 and illustrating a protruding optical fiber from the connector extending into an aperture of an optical assembly substrate.

A connector 122 constructed in accordance with another embodiment of the invention is illustrated in FIG. 14. The connector 122 is configured to mate with the optical assembly 10 and is similar to the connector 18, described above, except that the connector 122 is configured such that a terminal end of each of the optical fibers 124 protrudes a distance beyond an end face 126 of the connector 122. When the connector 122 is attached to the optical assembly 10, each of the protruding ends of the optical fibers 124 extends into or through one of the optical apertures 32 of the substrate 14 such that the optical fibers 124 terminate more closely to the optical transducer elements of the optical die 16, as illustrated in FIG. 16. By reducing or eliminating the gap between the optical die 16 and the terminal ends of the optical fibers 124, a more reliable optical connection is made between the optical fibers 124 and the optical die 16.

Figure 15:
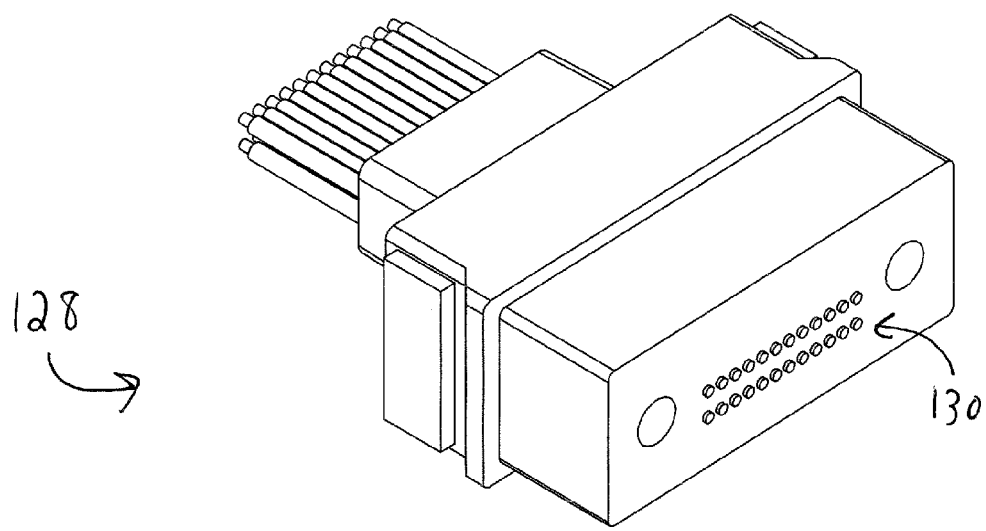
FIG. 15 is a front perspective view of a mechanically transferable optical connector constructed in accordance with yet another embodiment of the invention.

A connector 128 constructed in accordance with yet another embodiment of the invention is illustrated in FIG. 15. The connector 128 illustrated in FIG. 15 may be identical to the connector 122 illustrated in FIG. 14, except that the connector 128 includes two rows of optical fibers 1130 instead of one. Thus, the connector 122 illustrated in FIG. 14 may be used with the substrate 14, and the connector 128 illustrated in FIG. 15 may be used with the substrate 100. Each of the two rows of fibers 130 may be identical to the row of fibers 124 described above, including terminal ends that extend beyond an end face of the connector.

In both connectors 122, 128, the optical fibers may protrude a distance of between 0.01 mm and 1.0 mm, and more preferably a distance of between 0.1 mm and 0.8 mm. The optical fibers 124 may be separated by a distance of about 0.25 mm. The optical fibers 130 may be separated by a side-to-side distance of about 0.25 mm and the rows may be separated by a distance of about 0.5 mm.

An enlarged view of one of the protruding fibers 124 positioned within an aperture 32 of the substrate 14 is illustrated in FIG. 16. In some embodiments, the optical fiber 124 protrudes far enough into the aperture 32 to terminate very close to the optical die 16 but without contacting the die 16. Avoiding physical contact between the die 16 and the optical fiber 124, while not required, may prevent damage to the fiber 124, the die 16, or both. By way of example, a distance of less than 0.01 mm may separate the terminal end of the optical fiber 124 and the die 16. Thus, the optimal length of the protruding section of the optical fiber 124 will depend on such factors as the amount of space, if any, between the connector body 132 and the substrate 14, the thickness of the substrate 14, and the amount of space, if any, between the substrate 14 and the die 16. Reflowed solder bonds 134 providing physical and electrical connections between the substrate 14 and the die 16, for example, may separate the die 16 from the substrate 14 by a space.

Figure 17:
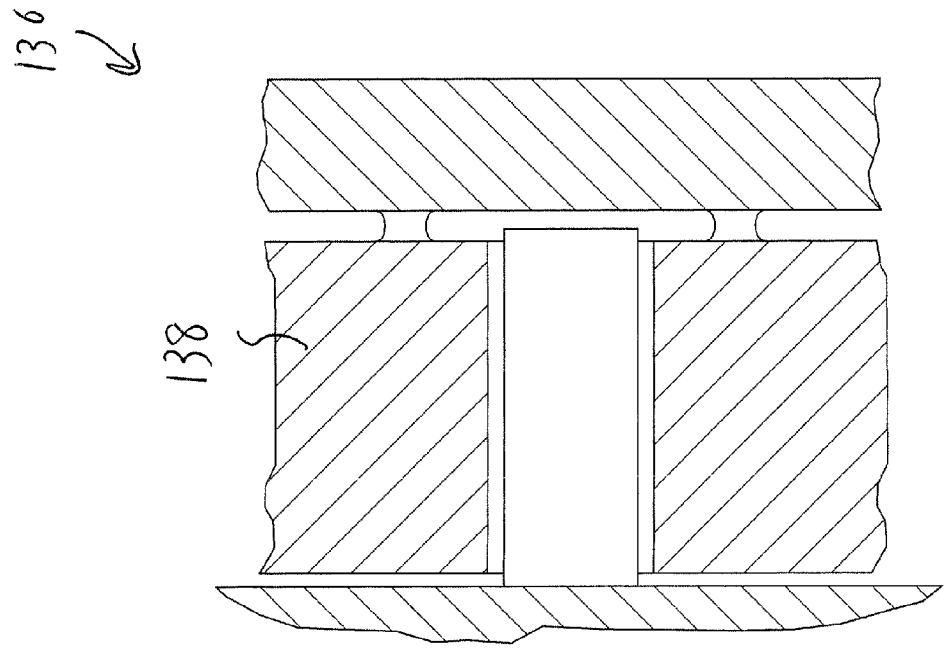
FIG. 17 is a fragmentary cross-sectional view of an optical interconnect assembly similar to that of FIG. 16, illustrating a substrate with a greater thickness and an optical fiber extending through an aperture in the substrate.

Because the protruding portion of the optical fiber 124 bridges the gap between the connector body 132 and the optical die 16, design constraints associated with the thickness of the substrate 14 are diminished and a wider range of substrate thicknesses may be used By way of example, an optical assembly 136 with a thicker substrate 138 is illustrated in FIG. 17. A thicker substrate may be desirable, for example, to provide greater structural strength and/or to accommodate additional internal printed circuit board layers.

In one embodiment, the protruding portion of each of the optical fibers 124 is approximately 0.125 mm in diameter, the substrate is approximately 0.150 mm thick, and the protruding portion of each of the fibers 124 is approximately 0.170 mm. As explained above, the substrate 14 may be approximately 0.150 mm thick. The thickness of the substrate may be substantially greater than 0.150 mm, and may be, for example, between 0.2 mm and 1.0 mm thick.

It will be appreciated that the invention described herein presents advantages that facilitate the manufacture and use of the optical assembly 10. The substrate 14 and mount 12, for example, are manufactured such that the alignment pin holes 34 of the substrate 14 are positioned relative to the die bonding elements 40 to enable precise positioning of the optical fibers of the connector 18 relative to the optical apertures 32 of the substrate 14 by inserting the alignment pins 21 through the alignment pin holes 34. Furthermore, When the optical die 16 is flip-chip bonded to the substrate 14 the solder reflow process causes the die 16 to self-align with the optical apertures 32. Thus, the assembly 10 can be quickly and easily assembled by simply flip-chip bonding the die 16 onto the substrate 14 and securing the substrate 14 to the mount 12 as explained above. The completed assembly 10 may then be mated with the connector 18 by hand using the alignment pins 21, wherein a user simply slides the connector 18 into engagement with the assembly 10. The advantages discussed in this paragraph also apply to the substrate 100 and the connectors 122 and 128.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An optical assembly comprising:
    a rigid mount;
    a printed circuit board substrate secured to the mount, the substrate having a first side and a second side opposite the first side, the substrate including:
        a first row of optical apertures extending through the substrate for receiving a first row of optical fiber ends therethrough; and
        a second row of optical apertures spaced from the first row of optical apertures and extending through the substrate for receiving a second row of optical fiber ends therethrough;
    a first optical die including a first plurality of optical transducer elements, each transducer element including an optical signal interface, the first optical die being mounted on the first side of the substrate such that the optical signal interface of each transducer element is aligned with an optical aperture of the first row of optical apertures;
    a first set of die bonding elements having first ends and second ends opposite the first ends, the first set of die bonding elements being connected to the first optical die at the first ends and extending along the first side of the substrate, through the substrate, and along the second side of the substrate;
    a first set of external connection elements positioned on the second side of the substrate and connected to the second ends of the first set of die bonding elements;
    a second optical die including a second plurality of optical transducer elements, each of the second plurality of optical transducer elements including an optical signal interface, the second optical die being mounted on the first side of the substrate such that the optical signal interface of each of the second plurality of optical transducer elements is aligned with an optical aperture of the second row of optical apertures;
    a second set of die bonding elements having first ends and second ends opposite the first ends, the second set of die bonding elements being connected to the second optical die at the first ends of the second set of die bonding elements and extending along the first side of the substrate; and
    a second set of external connection elements positioned on the first side of the substrate and connected to the second ends of the second set of die bonding elements.

2. The optical assembly of claim 1, the first plurality of optical transducer elements being optical sensors.

3. The optical assembly of claim 2, the first plurality of optical transducer elements being photodiodes.

4. The optical assembly of claim 2, the second plurality of optical transducer elements being optical emitters.

5. The optical assembly of claim 4, the second plurality of optical transducer elements being laser diodes.

6. The optical assembly of claim 1,
    wherein the first set of die bonding elements and the first set of external connection elements are laterally offset from the second set of die bonding elements and the second set of external connection elements.

7. The optical assembly of claim 6, the first plurality of external connection elements being on a first side of the substrate and the second plurality of external connection elements being on a second side of the substrate.

8. The optical assembly of claim 6,
    the first plurality of die bonding elements including a pair of metal pads associated with each of the apertures in the first row of apertures, and
    the second plurality of die bonding elements including a pair of metal pads associated with each of the apertures in the second row of apertures.

9. The optical assembly of claim 1, the first row of optical apertures being parallel with the second row of optical apertures and separated therefrom by a space.

10. An optical assembly comprising:
    a rigid mount;
    a printed circuit board substrate secured to the mount, the substrate having a first side and a second side opposite the first side, the substrate having a thickness of approximately 0.75 millimeters and including:
        a first row of optical apertures extending through the substrate for receiving a first row of optical fiber ends therethrough; and
        a second row of optical apertures spaced from the first row of optical apertures and extending through the substrate for receiving a second row of optical fiber ends therethrough, the optical apertures each having a diameter of approximately 0.152 millimeters and a center-to-center distance from consecutive optical apertures of approximately 0.25 millimeters;
    a first optical die including a first plurality of optical transducer elements, each transducer element including an optical signal interface, the first optical die being mounted on the first side of the substrate such that the optical signal interface of each transducer element is aligned with an optical aperture of the first row of optical apertures;
    a first set of die bonding elements having first ends and second ends opposite the first ends, the first set of die bonding elements being connected to the first optical die at the first ends and extending along the first side of the substrate, through the substrate, and along the second side of the substrate;
    a first set of external connection elements positioned on the second side of the substrate and connected to the second ends of the first set of die bonding elements;
    a second optical die including a second plurality of optical transducer elements, each of the second plurality of optical transducer elements including an optical signal interface, the second optical die being mounted on the first side of the substrate such that the optical signal interface of each of the second plurality of optical transducer elements is aligned with an optical aperture of the second row of optical apertures;
    a second set of die bonding elements having first ends and second ends opposite the first ends, the second set of die bonding elements being connected to the second optical die at the first ends of the second set of die bonding elements and extending along the first side of the substrate; and
a second set of external connection elements positioned on the first side of the substrate and connected to the second ends of the second set of die bonding elements.

\* \* \* \* \*